(12) United States Patent
Ward et al.

(10) Patent No.: US 7,011,584 B2
(45) Date of Patent: Mar. 14, 2006

(54) SELF-ATTACHING FEMALE FASTENERS AND METHOD OF FORMING FEMALE FASTENER ELEMENTS

(75) Inventors: Richard P. Ward, Canton, MI (US); John J. Vrana, Rochester Hills, MI (US)

(73) Assignee: Whitesell International Corporation, Taylor, MI (US)

( * ) Notice: Subject to any disclaimer, the term of this patent is extended or adjusted under 35 U.S.C. 154(b) by 151 days.

(21) Appl. No.: 10/691,677

(22) Filed: Oct. 23, 2003

(65) Prior Publication Data

US 2004/0087381 A1    May 6, 2004

Related U.S. Application Data

(60) Provisional application No. 60/420,518, filed on Oct. 23, 2002.

(51) Int. Cl.
*B21D 53/24* (2006.01)

(52) U.S. Cl. ............................. 470/25; 470/21; 470/22; 470/87

(58) Field of Classification Search .................... 470/2, 470/5, 18–22, 24–26, 87, 89, 95, 96, 106–109, 470/907

See application file for complete search history.

(56) References Cited

U.S. PATENT DOCUMENTS

| | | | | |
|---|---|---|---|---|
| 559,782 A | * | 5/1896 | Mosley | 411/222 |
| 996,133 A | * | 6/1911 | Peters | 411/237 |
| 2,325,303 A | * | 7/1943 | Brooke | 411/303 |
| 2,333,388 A | * | 11/1943 | Poupitch | 411/302 |
| 2,651,060 A | * | 9/1953 | Misch | 470/19 |
| 2,707,322 A | | 5/1955 | Strain et al. | |
| 3,299,500 A | * | 1/1967 | Double | 29/432.2 |
| 3,648,747 A | | 3/1972 | Steward | |
| 3,797,547 A | * | 3/1974 | Shinjo | 411/303 |
| 3,845,860 A | | 11/1974 | Ladouceur et al. | |
| 4,690,599 A | | 9/1987 | Shinjo | |
| 4,984,319 A | * | 1/1991 | Reynolds | 470/19 |
| 2003/0190214 A1 | | 10/2003 | Babej et al. | |

FOREIGN PATENT DOCUMENTS

WO    WO 03/016728    2/2003

OTHER PUBLICATIONS

PCT/US03/33951 International Search Report.

* cited by examiner

*Primary Examiner*—Ed Tolan
(74) *Attorney, Agent, or Firm*—Howard & Howard

(57) ABSTRACT

A method of forming a female fastener including rolling a body portion strip having a midportion and flange portions on opposed sides of the midportion, piercing spaced openings through the midportion, cutting the strip to length between the openings, cold forming a separate generally cylindrical pilot portion having a length greater than the width of the midportion and a diameter greater than the opening through the midportion, preferably including radial splines, and press fitting the pilot portion through the opening in the midportion. The self-attaching female fastener thus includes a rectangular body portion and a generally cylindrical pilot portion having an end face spaced above a plane of the midportion and may be formed of a harder metal than the body portion.

16 Claims, 2 Drawing Sheets

SELF-ATTACHING FEMALE FASTENERS AND METHOD OF FORMING FEMALE FASTENER ELEMENTS

RELATED APPLICATIONS

This application claims priority to U.S. Provisional Patent Application Ser. No. 60/420,518 filed Oct. 23, 2002.

FIELD OF THE INVENTION

This invention relates to a self-attaching female fastener and method of manufacturing or forming self-attaching female fastener elements, including pierce, clinch and weld nuts, wherein the body portion is generally rectangular and the pilot portion may be any shape including generally circular or cylindrical, wherein the body portion is formed by rolling and the pilot portion is formed by cold heading or in a progressive die.

BACKGROUND OF THE INVENTION

The predecessor in interest of the assignee of this Application invented and developed the first self-piercing female fastener, now commonly referred to as a pierce nut as shown, for example, in U.S. Pat. No. 2,707,322. The pierce nut disclosed in this patent has been commercially successful, particularly for mass production applications for attachment of one component to a second component by the automotive and appliance industries. In a typical application, the pierce nut is installed in a metal panel by an installation head, which is commonly installed in the upper die shoe or platen of a die press, and a die member or die button is installed in the lower die shoe or die platen. The pierce nuts are fed to the installation head, which includes a reciprocating plunger, and a pierce nut is installed by the plunger with each stroke of the die press. The panel to which the pierce nut is installed may be simultaneously formed by the die press. Of course, numerous improvements have been made to the pierce nut disclosed in the above-referenced patent, including improved retention, by providing dovetail-shaped grooves on opposed sides of the pilot portion as described, for example, in U.S. Pat. No. 3,648,747, also assigned to the predecessor in interest of the assignee of the present application. Finally, in many mass production applications, it is preferable to assemble the pierce nuts in a continuous frangible strip, as disclosed in U.S. Pat. No. 3,845,860, which is also assigned to the predecessor in interest of the assignee of the present Application.

The pierce nuts disclosed in the above-referenced U.S. patents are formed by rolling the desired cross-sectional configuration of the pierce nut, generally starting with round wire, as known by those skilled in this art. The round wire is then rolled by flattening opposed sides of the wire and the wire is then continuously rolled into the desired cross-section of the pierce nut, wherein the pierce nut section includes a rectangular central projecting pilot portion and flange portions on opposed sides of the pilot portion. In the Hi-Stress™ pierce nut, available from the assignee of this Application, grooves are rolled into the flange portion on opposed sides of the pilot portion preferably having at least one inclined groove wall, referred to as a "re-entrance" groove, which improves retention of the fastener on the panel following installation. The rectangular pilot portion of the pierce nut strip is then pierced, forming the pierce nut bore, and the section is then cut to length between the pierce bores and the bore may be tapped, if desired.

As will be understood by those skilled in this art and shown in the above-referenced U.S. patents, the pierce nuts formed by the rolling method described above are rectangular and include a rectangular pilot portion. However, in certain applications, it is desirable to have a pierce nut of the type described above, wherein the pilot portion is not rectangular, but is generally cylindrical for example. It has not been possible, however, to form a pierce nut having a generally cylindrical pilot portion by conventional rolling processes. It is an object of this invention to combine the advantages of a high speed rolling process with conventional cold header or progressive die techniques to form a pierce nut of the type described above having a pilot portion which is not rectangular and preferably generally cylindrical in shape.

SUMMARY OF THE INVENTION

As set forth above, the present invention relates to a self-attaching fastener and a method of forming self-attaching female elements, which combines the advantages of commercial high speed rolling processes and self-attaching fasteners having a generally circular or cylindrical pilot portion formed by cold heading or progressive die techniques. As used herein, the term "cold heading" includes any method of forming in a die or die press, including forming in a progressive die. The self-attaching female fastener elements formed by the method of this invention may include a central pilot portion having any convenient shape which may be formed by cold heading techniques, including cylindrical or generally cylindrical pilot portions and female fastener elements formed by this method may be utilized either as a pierce or clinch nut, depending upon the application for the female fastener element.

The method of forming self-attaching female fastener elements of this invention includes forming a body portion of the female fastener element by rolling a continuous metal wire or strip including flange portions on opposed sides of the strip having a cross section of the flange portions of the self-attaching female fastener elements to be formed and a body or midportion between the flange portions. In one preferred embodiment, the flange portions project from the midportion, each having a top or bearing face spaced above the plane of the midportion, and the midportion may have opposed planar faces between the flange portions. The method of this invention then includes cutting the strip into discrete segments of equal length, each having a length equal to a desired length of the self-attaching female fastener elements, including end faces where the strip has been cut. The piercing operation may be performed either following cutting of the strip into discrete segments or more preferably prior to the cutting step, providing greater control of the location of the opening through the midportion of the female fastener elements.

The method of this invention further includes separately forming the pilot portion of the self-attaching female fastener elements by cold heading and inserting the pilot portion into the openings formed in the midportion of the body portion, wherein the pilot portion includes an end face spaced above the plane of the midportion. Where the self-attaching female fastener elements are to be utilized as a pierce nut, the end face of the pilot portion is preferably spaced above the panel supporting faces of the flange portions. The pilot portion is preferably formed by cold heading and may therefore take any desired shape for the application of the female fastener element, including generally cylindrical.

The pilot portion may also be formed from a metal which is harder than the metal strip forming the body portion. This is a particular advantage where the self-attaching fastener element is utilized as a pierce nut providing improved strength for the pilot portion which pierces the metal panel and a softer metal for the body portion which supports the panel. Where the fastener is utilized as a clinch nut, the pilot may be formed of a softer metal, such as aluminum.

In one preferred embodiment of the method of forming self-attaching female fastener elements of this invention, the pilot portion is generally cylindrical, but includes radial portions or splines which form an interference fit with the opening through the midportion of the body portion, thereby preventing rotation of the pilot portion relative to the body portion. In the disclosed embodiment, the pilot portion is generally cylindrical and includes radial splines, each having a cylindrical outer surface, having a major diameter greater than the opening through the midportion of the body portion, providing an interference fit and preventing rotation of the pilot portion relative to the body portion. In this embodiment, the splines continue above the plane of the midportion of the body portion, providing additional torque resistance when the pierce nut is installed in a panel.

In the disclosed embodiment of the method of forming self-attaching female fastener elements of this invention, the opening formed through the midportion of the body portion includes a counterbore opening through the backface of the body portion and the separately formed pilot portion includes a radial flange portion which is received in the counterbore, preventing pull-through of the pilot portion following installation. The method of forming self-attaching female fasteners of this invention thereby provides the advantages of a rolled section formed by a high speed rolling mill with the advantages of a self-attaching female fastener element formed by cold heading techniques.

As will be understood from the above description of the method of forming a female fastener of this invention, the self-attaching female fastener of this invention includes a generally rectangular body portion preferably formed by rolling techniques as described above including flange portions on opposed sides of the body portion and a midportion between the flange portions having an opening therethrough and a separately formed, generally cylindrical pilot portion having an axial length greater than the midportion and a major diameter greater than the opening through the midportion of the body portion press fit through the opening having an end face spaced above a plane of the mid portion. As set forth above, the pilot portion may be formed of a metal harder than the body portion, particularly when the female fastener is utilized as a self-piercing fastener element. In a preferred embodiment, the pilot portion includes a plurality of spaced radial splines having a major diameter greater than an internal diameter of the opening through the midportion and the midportion is deformed radially inwardly between the spaced radial splines. In a preferred embodiment, the spaced radial splines include a generally cylindrical outer surface having an outer diameter greater than the internal diameter of the opening through the midportion and relatively inclined side walls. That is, at least one of the side walls is inclined toward the opposed side wall forming an opening between the side walls having a width less than the inner surfaces between the spaced radial splines. In a preferred embodiment, both side walls are inclined toward the opposed side wall providing optimum torque resistance to rotation of the pilot portion relative to the body portion. Other advantages and meritorious features of the self-attaching fastener and method of forming self-attaching female fastener elements will be more fully understood from the following description of the preferred embodiments, the appended claims, and the drawings, a brief description of which follows.

DETAILED DESCRIPTION OF A PREFERRED EMBODIMENT

Figure 1:
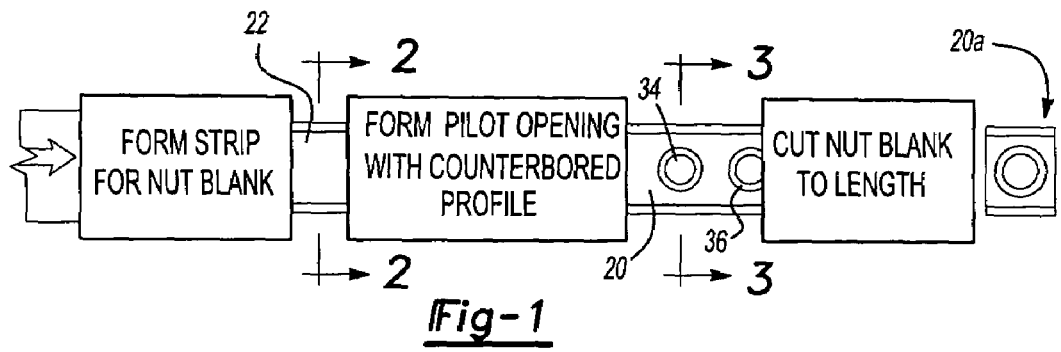
FIG. 1 illustrates schematically a method of forming the body portion of one embodiment of a self-attaching female fastener element.

As will be understood, the method of forming self-attaching female fastener elements of this invention may be utilized to form various embodiments of female fastener elements and the female fastener elements shown in the drawings are for illustration purposes only. For example, the shape of the body portion formed by rolling a continuous strip will depend upon both the application of the self-attaching female fastener element and the rolling process used. Similarly, the shape of the pilot portion will depend upon the application of the self-attaching female fastener element and the cold heading technique used to form the pilot portion. FIG. 1 illustrates only one preferred embodiment.

Figure 2:
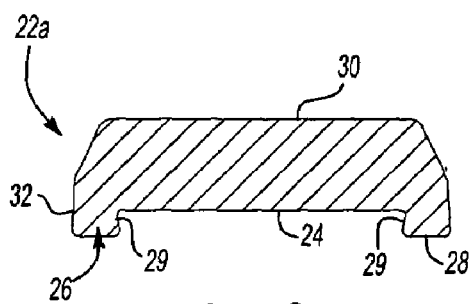
FIG. 2 is a cross-section of FIG. 1 in the direction of view arrows 2—2.
Figure 3:
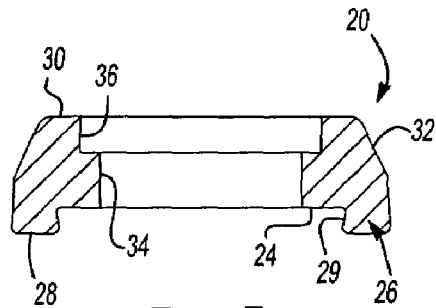
FIG. 3 is a cross-section of FIG. 1 in the direction of view arrows 3—3.

As shown in FIGS. 1 to 3, the body portion 20 or nut blank of the self-attaching female fastener element shown in FIG. 3 may be formed from a continuous rolled strip 22 shown in FIG. 1, wherein the strip is rolled into the desired configuration of the body portion of the female fastener element as shown at 22a in FIG. 2. As will be understood by those skilled in this art, the continuous rolled strip 22 may be formed from a metal wire, such as steel, wherein the wire initially may have a round cross-section and the cross-section shown in FIG. 2a is formed by a plurality of rollers (not shown) as the wire is received through the rolling mill. The cross-section 22a shown in FIG. 2 includes a midportion having a planar face 24, flange portions 26 on opposed sides of the planar midportion, each having a top or panel supporting face 28, spaced above the plane of the planar midportion 24 and inclined side faces 29, which are inclined inwardly from the planar face of the midportion 24 to the top faces 28 of the flange portions 26. The nut blank or body portion 22A shown in FIG. 2 further includes a generally planar back face 30 and side faces 32.

Figure 6:
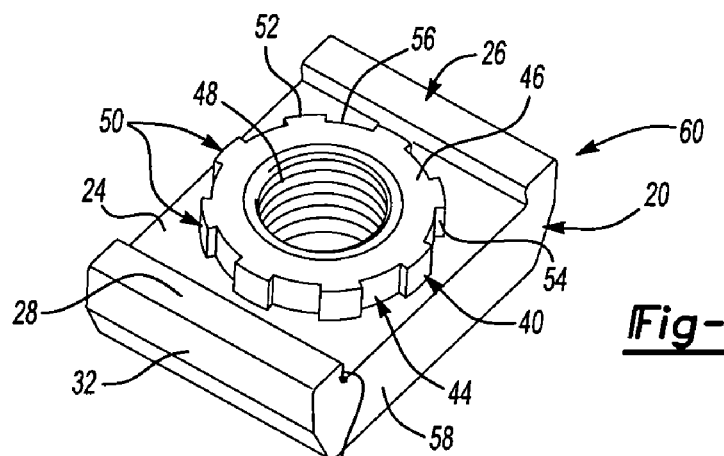
FIG. 6 is a top perspective view of a self-attaching female fastener element of this invention formed by the method of this invention.
Figure 7:
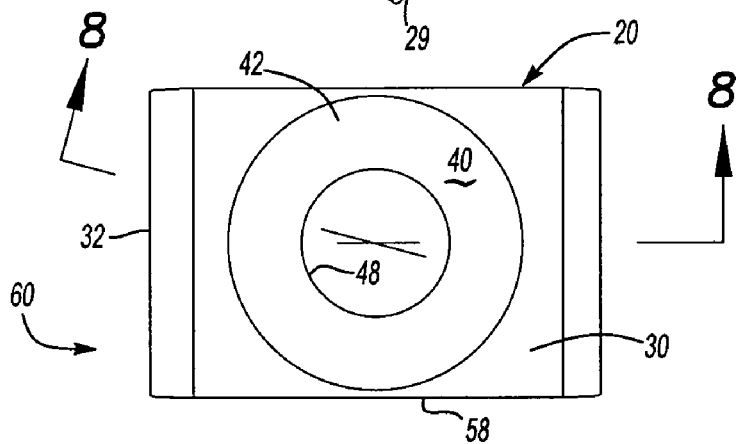
FIG. 7 is a bottom view of the self-attaching female fastener element shown in FIG. 6.

As shown in FIG. 1, the planar midportion 24 is then formed with a cylindrical opening 34 through the planar face of the midportion 24 and a cylindrical counterbore 36 through the backface 30 having a diameter greater than the cylindrical opening 34 as formed through the backface 30. The body portion or nut blank may then be cut to length as shown at 20a in FIG. 1, forming planar side or sheared faces 58 shown in FIG. 6.

Figure 4:
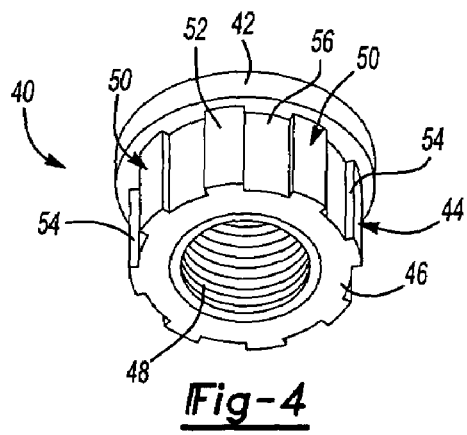
FIG. 4 is a perspective view of one embodiment of a separately formed pilot portion.

The embodiment of the separately formed generally cylindrical pilot portion shown in FIG. 4 includes a cylindrical flange portion 42 having an external diameter generally equal to or slightly greater than the internal diameter of the counterbore 36 of the body portion 20 shown in FIG. 3, a smaller diameter generally cylindrical end portion 44 having an end face 46 and a bore 48, which may be internally threaded as shown. Alternatively, the bore 48 may be smooth for receipt of a thread forming or thread rolling screw or bolt. The reduced diameter portion 44 in the disclosed embodiment also includes a plurality of radial splines 50 each having a cylindrical outer surface 52 and inwardly inclined generally radial surfaces 54. In this embodiment, the generally radial inclined surfaces 54 are inclined radially outwardly from the cylindrical inner surface 56, such that the splines are dovetail-shaped. Alternatively, the surfaces 54 may be radial. The external diameter of the cylindrical outer surfaces 52 of the radial splines 50 is preferably greater than the internal diameter of the cylindrical opening 34 in the planar midportion 24 of the body portion 20 shown in FIGS. 3 and 5. As set forth above, the cylindrical flange portion 42 has an external diameter generally equal to or slightly greater than the internal diameter of the counterbore 36 and the width or axial length of the cylindrical flange portion 42 is approximately equal to the depth of the counterbore 36.

Figure 5:
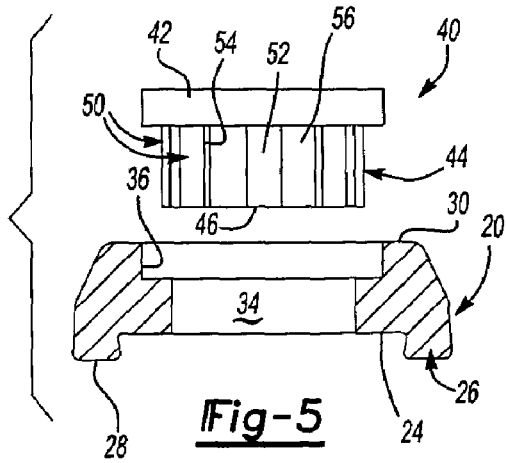
FIG. 5 is a partially cross-sectioned side view illustrating a method of installing the pilot portion shown in FIG. 4 in the body portion illustrated in FIG. 3.

FIG. 5 illustrates the assembly of the pilot portion 40 in the body portion 20, wherein the smaller diameter generally cylindrical portion 50 of the pilot portion 40 is received through the counterbore 36 and then press fit through the opening 34 in the planar midportion 24 of the body portion 20. As will be understood, the dovetail-shaped radial splines 50 inelastically and permanently deform the surface of the cylindrical opening 34, forming a secure assembly and preventing rotation of the pilot portion 40 relative to the body portion 20. The cylindrical flange portion 42 prevents pull-through of the pilot portion 40 relative to the body portion 20.

Figure 8:
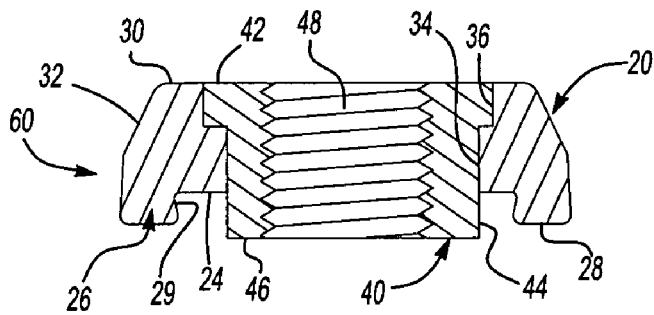
FIG. 8 is a side cross-sectional view of the self-attaching female fastener element shown in FIG. 7 in the direction of view arrows 8—8.
Figure 9:
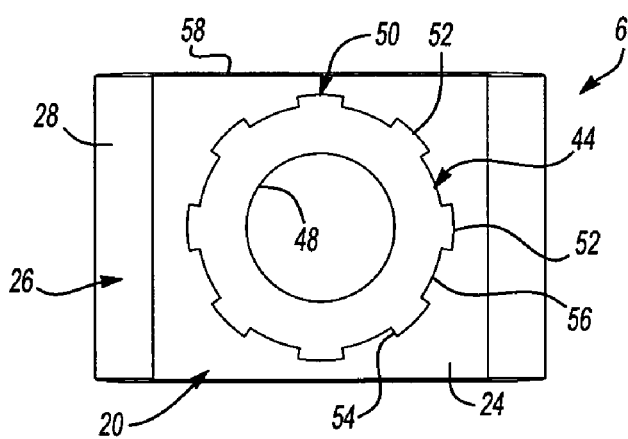
FIG. 9 is a top view of the self-attaching female fastener elements shown in FIGS. 6 to 8.

FIGS. 6 to 9 illustrate one embodiment of a self-attaching female fastener element 60 formed by a method of this invention. In the disclosed embodiment shown in FIGS. 6 and 8, the smaller diameter end portion 44 of the pilot portion 40 projects beyond the planar midportion 24 of the body portion 20 and preferably beyond the top or panel bearing faces 28 of the flange portions 26 as shown in FIG. 8. Alternatively, the end face 46 of the pilot portion 40 may be flush or coplanar with the top faces 28 of the flange portions. The cylindrical flange portion 42 of the pilot portion 40 is preferably flush with the planar backface 30 of the body portion 20. The end face 46 of the pilot portion may then be utilized as a piercing face to pierce an opening in a metal panel (not shown), such that the self-attaching female fastener element 60 may be utilized as a pierce nut to pierce an opening in a panel (not shown) as described in the above-referenced patents, wherein the panel is deformed beneath the inwardly inclined side walls 29. Alternatively, the projecting end portion 44 may be received through a preformed opening in a panel and utilized as a clinch nut. In either application, the dovetail-shaped radial splines 50 on the projecting end portion 44 of the pilot portion will form a mirror image opening in a panel, providing a more secure installation providing torque resistance. The pilot portion 40 is prevented from being pulled through the body portion 20 by the cylindrical flange portion 42 and the inclined surfaces 29 on the flange portions 26 provide improved push-off strength for the fastener and panel assembly.

As will be understood, the self-attaching fastener and method of forming a self-attaching female fastener element of this invention may be easily modified for manufacture of pierce nuts of various shapes. For example, the method of this invention may be utilized to manufacture the pierce nuts illustrated in the above-referenced U.S. Pat. No. 2,707,322, wherein the flange portions do not project above the plane of the midportion. Further, the shape of the projecting smaller diameter end portion may be configured for any suitable application. For example, the end portion which projects beyond the planar midportion 24 may be oval, inclined radially outwardly or a smooth cylindrical surface. Where the pilot portion includes radial portions as described, the radial portions may have various configurations, but preferably includes radial splines having a generally cylindrical outer surface having a diameter greater than the opening pierced through the midportion of the body portion, such that the pilot portion is press fit through the pierced opening and an inner surface having a diameter less than the opening through the midportion, such that the midportion is deformed into the spaces between the splines and preferably against an inner surface between the splines preventing rotation of the pilot portion relative to the body portion. In a preferred embodiment, the side walls of the splines are relatively inclined, such that at least one of the side walls extends toward the opposed side walls. In a more preferred embodiment as disclosed above, both side walls are inclined inwardly from the inner surface of the radial splines forming a re-entrant groove providing optimum torque resistance. However, the radial splines may have various configurations and the self-attaching fastener and method of this invention is not limited to the configuration of the splines. Further, as set forth above, the opening through the midportion of the body portion may be formed either prior to cutting the body portions to length as disclosed or after cutting the strip to length. Finally, the self-attaching female fastener elements may be interconnected in a strip using frangible connector elements as disclosed, for example, in the above-referenced U.S. Pat. No. 3,845,860. Having described one preferred embodiment of the method of forming self-attaching female fastener elements, the invention is now claimed, as follows.

What is claimed is:

1. A method of forming self-attaching female fastener elements, comprising the following steps:

forming a body portion of said self-attaching female fastener elements by rolling a continuous metal strip including radial flange portions on opposed sides of said strip having a crosssection of the flange portions of said self-attaching female fastener elements and a midportion between said flange portions;

cutting said strip into discrete segments of equal length each having a length equal to a length of said self-attaching female fastener elements, including end faces;

piercing an opening through said midportion equally spaced between said end faces; and separately forming generally cylindrical pilot portions having a diameter greater than said opening through said midportion and a length greater than a width of said midportion and press fitting one of said pilot portions in each of said openings, wherein each of said pilot portions has an end face spaced above a plane of said midportion.

2. The method of forming self-attaching female fastener elements as defined in claim 1, wherein said method includes rolling said continuous metal strip with upstanding flange portions on said opposed sides of said strip each having a top face spaced above a plane of said midportion.

3. The method of forming self-attaching female elements as defined in claim 2, wherein said method includes rolling a generally planar midportion between said upstanding flange portions.

4. The method of forming self-attaching female fastener elements as defined in claim 1, wherein said method includes separately forming said pilot portion from a metal harder than said body portion.

5. The method of forming self-attaching elements as defined in claim 4, wherein said method includes forming said pilot portion by cold forming.

6. The method of forming self-attaching female fastener elements as defined in claim 1, wherein said method includes forming a first opening through one face of said midportion having a first internal diameter, forming a second opening through an opposed face of said midportion having a second internal diameter greater than said first internal diameter, forming said pilot portion with a first portion having a first external diameter generally equal to said second internal diameter of said opening and a second portion having an external diameter greater than said first opening and inserting said second portion of said pilot portion through said second opening and press fitting said second portion of said second portion through said first opening.

7. The method of forming self-attaching female fastener elements as defined in claim 1, wherein said method includes separately forming a generally cylindrical pilot portion having radially extending portions, wherein said radially extending portions have a major diameter greater than said opening through said midportion and press fitting said pilot portion through said opening.

8. The method of forming self-attaching female fastener elements as defined in claim 7, wherein said method includes forming radial splines on an external diameter of said pilot portion having a major diameter greater than said opening and press fitting said splines through said opening.

9. The method of forming self-attaching female fastener elements as defined in claim 8, wherein each of said radial splines include a generally cylindrical outer surface having a diameter greater than said opening through said midportion, an inner surface between said splines having a diameter less than said opening through said midportion and relatively inclined side walls, said method including press fitting said outer surface through said opening through said midportion and deforming said midportion into said inner surface of said splines.

10. A method of forming self-attaching female fastener elements, comprising the following steps:

forming a body portion of said self-attaching female fastener elements by rolling a continuous metal strip including a generally planar midportion and flange portions on opposed sides of said strip each having a top face spaced above a plane of said generally planar midportion;

cutting said strip into discrete segments of equal length each having a length equal to a length of said self-attaching female fastener elements, including end faces; piercing an opening through said midportion equally spaced between said end faces; and separately forming a pilot portion having a diameter greater than an internal diameter of said opening through said midportion and an axial length greater than a width of said generally planar midportion and press fitting said pilot portion in each of said openings, wherein each pilot portion includes an end face spaced above said plane of said generally planar midportion.

11. The method of forming self-attaching female fastener elements as defined in claim 10, wherein said method includes forming a generally cylindrical pilot portion having generally radial portions, wherein said generally radial portions have a major diameter greater than said opening forming an interference fit with said opening as said pilot portion is press fit into said opening.

12. The method of forming self-attaching female fastener elements as defined in claim 10, wherein said method includes forming radial splines on an exterior surface of said pilot portion, wherein said splines have a major diameter greater than said opening, and press fitting said splines into an internal surface of said opening, preventing rotation of said pilot portion relative to said body portion.

13. The method of forming self-attaching female fastener elements as defined in claim 10, wherein said method includes forming said pilot portion from a metal harder than said body portion.

14. The method of forming self-attaching female fastener elements as defined in claim 10, wherein said method includes forming said pilot portion by cold forming.

15. The method of forming self-attaching female fastener elements as defined in claim 10, wherein said method includes forming a first opening through one face of said midportion having a first internal diameter, forming a second opening through an opposed face of said midportion coaxially aligned with said first opening having a second internal diameter greater than said first internal diameter, forming said pilot portion with a first portion having an external diameter generally equal to said second internal diameter and a second portion having an external diameter greater than said first internal diameter and inserting said second portion of said pilot portion through said second opening.

16. The method of forming self-attaching female fastener elements, as defined in claim 15, wherein said method includes forming said second portion of said pilot portion with radially extending portions having a major diameter greater than said first internal diameter and press fitting said second portion of said pilot portion into said first opening.

* * * * *